United States Patent [19]

Beighe et al.

[11] Patent Number: 5,742,607

[45] Date of Patent: Apr. 21, 1998

[54] METHOD AND APPARATUS FOR CONTROLLING TWO WAY COMMUNICATION VIA DISPARATE PHYSICAL MEDIA

[75] Inventors: Ed Beighe, Phoenix; Surjit Ahluwalia, Chandler, both of Ariz.

[73] Assignee: Intel Corporation, Santa Clara, Calif.

[21] Appl. No.: 575,776

[22] Filed: Dec. 20, 1995

[51] Int. Cl.⁶ .................................. H04L 12/28
[52] U.S. Cl. ........................ 370/419; 395/200.02
[58] Field of Search .................... 370/419, 463, 370/474, 476; 395/200.02, 200.03, 200.06, 200.2

[56] References Cited

U.S. PATENT DOCUMENTS

| | | | |
|---|---|---|---|
| 5,289,579 | 2/1994 | Punj | 395/200 |
| 5,297,138 | 3/1994 | Black | 370/254 |
| 5,347,304 | 9/1994 | Moura et al. | 348/12 |
| 5,410,754 | 4/1995 | Klotzbach et al. | 370/85.13 |
| 5,432,907 | 7/1995 | Picazo, Jr. et al. | 395/200 |
| 5,446,736 | 8/1995 | Gleeson et al. | 370/85.13 |
| 5,459,720 | 10/1995 | Iliev et al. | 370/393 |
| 5,515,508 | 5/1996 | Pettus et al. | 395/200.33 |
| 5,524,113 | 6/1996 | Gaddis | 370/60.1 |
| 5,530,808 | 6/1996 | Hammond et al. | 395/200.2 |
| 5,535,336 | 7/1996 | Smith et al. | 395/200.06 |

*Primary Examiner*—Hassan Kizou
*Assistant Examiner*—A. Bnimoussa
*Attorney, Agent, or Firm*—Blakely, Sokoloff, Taylor & Zafman

[57] ABSTRACT

A method and apparatus for controlling two way communication via disparate physical media. A computer comprises a central processor, a forward channel interface, a return channel interface, and a main memory, each being coupled to a bus. The forward channel interface is further coupled to interrupt the central processor and coupled to receive a packet from a forward channel. The main memory contains an interrupt service routine comprising a first set of code for passing the packet to a routine for decapsulating the packet and a second set of code for passing a second packet to the return channel interface. The method comprises a computer transferring a packet from a forward channel interface to a main memory. The central processor analyzes the packet to determine if the packet is a data packet or a network management packet. If the packet is a network management packet, the central processor creates a response packet and passes the response packet to a return channel interface.

21 Claims, 4 Drawing Sheets

METHOD AND APPARATUS FOR CONTROLLING TWO WAY COMMUNICATION VIA DISPARATE PHYSICAL MEDIA

FIELD OF THE INVENTION

The present invention pertains to the field of network access from a personal computer and specifically, a method and apparatus for controlling two way communication via disparate media using routines executed by a central processor in a computer.

BACKGROUND

The cable system offers the potential to bring the information superhighway into households across the nation. Advanced modulation and demodulation devices now deliver digital data packets across a broadband coaxial cable system at data rates beyond those previously achieved by telephonic systems. One example of a broadband cable network is described in U.S. Pat. No. 5,347,304.

Unfortunately, such a cable network does not support a separate return path of equal bandwidth. Nor does the broadband cable network support the popular ethernet style Carrier Sense Multiple Access/Collision Detect (CSMA/CD) system. Instead, a separate return channel completes a communication link with an information service provider.

A time sliced upstream channel through the cable network offers one possible return mechanism. In this case, a special protocol manages time sliced access to the upstream channel. Generally, the protocol involves a router (server) at a central sight polling local machines (clients), and upstream bandwidth being allocated according to timely poll responses. Network management packets also provide periodic status information and various other functions.

Unfortunately, not all cable systems provide sufficient (if any) return channel capacity. A separate return channel such as the telephone system can help overcome such a lack of upstream bandwidth. A modem can provide the return mechanism. Accordingly, a bi-directional network link may be established through a forward channel such as the cable system and a separate return channel.

A remote link adapter (RLA or cable modem) is described in U.S. Pat. No. 5,347,304. This RLA accesses the cable network and provides several return options including the telephone system. While this system establishes an interface between a service provider and computer, it replicates several functions provided by components present in the computer itself.

The present invention utilizes already existing computer system resources for tasks accomplished separately by the prior art RLA. This advantageously eliminates duplicated components. A resulting decrease in cost, space, and power dissipation make a network interface of the present invention more attractive and more likely to gain widespread acceptance.

For example, the embodiment of the prior art RLA using the telephone return channel includes a return channel interface and a modem apart from other pre-existing computer components. Typically, computers offer a well known modem interface such as a COM port, and in fact often include the modem itself. Thus, the prior art RLA unnecessarily duplicates some pre-existing computer system capabilities.

Problems arise when attempting to provide a single network connection using two communication devices. An application program executed by the computer typically needs to establish separate sockets to communicate with the separate devices. Since most applications presently connect to a network through a single socket, they cannot properly communicate when a network connection uses separate devices for forward and return channels.

The use of existing computer resources for such a connection is further complicated by the need for control transparent to application programs. Lower level protocol layers do not appropriately screen and control packet flow based on content as necessary to respond to network management packets. Nor do such lower level protocol layers provide the control necessary to queue outgoing packets for a separate return channel.

As described in application Ser. No. 08/575,779 entitled "A Method and Apparatus for Controlling and Modifying Packet Flow," filed concurrently herewith, computer system resources can be used to implement packet flow control and modification. As described herein, computer system resources can also be utilized to provide two way communication via disparate media.

SUMMARY

An apparatus for controlling two way communication via disparate physical media is described. A computer of the present invention comprises a central processor, a forward channel interface, a return channel interface, and a main memory, each being coupled to a bus. The forward channel interface is further coupled to interrupt the central processor and coupled to receive a packet from a forward channel. The main memory contains an interrupt service routine comprising a first set of code for passing the packet to a routine for decapsulating the packet and a second set of code for passing a second packet to the return channel interface. The main memory may further contain a user application which generates a data packet. The second set of code may also pass the data packet to the return channel interface.

A method of processing a packet is also described. The method comprises a computer transferring the packet from a forward channel interface to a main memory. The central processor analyzes the packet to determine if the packet is a data packet or a network management packet. If the packet is a network management packet, the central processor creates a response packet and passes the response packet to a return channel interface. The method may also include passing a data packet created by a user application to the return channel interface.

BRIEF DESCRIPTION OF THE FIGURES

The present invention is illustrated by way of example and not limitation in the figures of the accompanying drawings.

DETAILED DESCRIPTION

A method and apparatus for controlling two way communication via disparate physical media is described. In the following description, numerous specific details are set forth, such as protocol layer names, packet formats, packet fields, and other data structures in order to provide a thorough understanding of an embodiment of the present invention. It will be appreciated by those skilled in the art that the present invention may be practiced without these specific details.

For convenience, this disclosure refers to packets as being "passed" from one component or one routine to another. It should be understood that "passing" of a packet may be accomplished in a number of ways. For example, the actual data comprising the packet can be moved or copied from one component to another. A packet can also be moved from one memory location or register to another. Alternately, a pointer or a data structure containing a pointer may be transferred between memory locations, registers, and components. One skilled in the art will recognize that these and other similar methods of packet "passing" may be used interchangeably when practicing the present invention.

Figure 1:
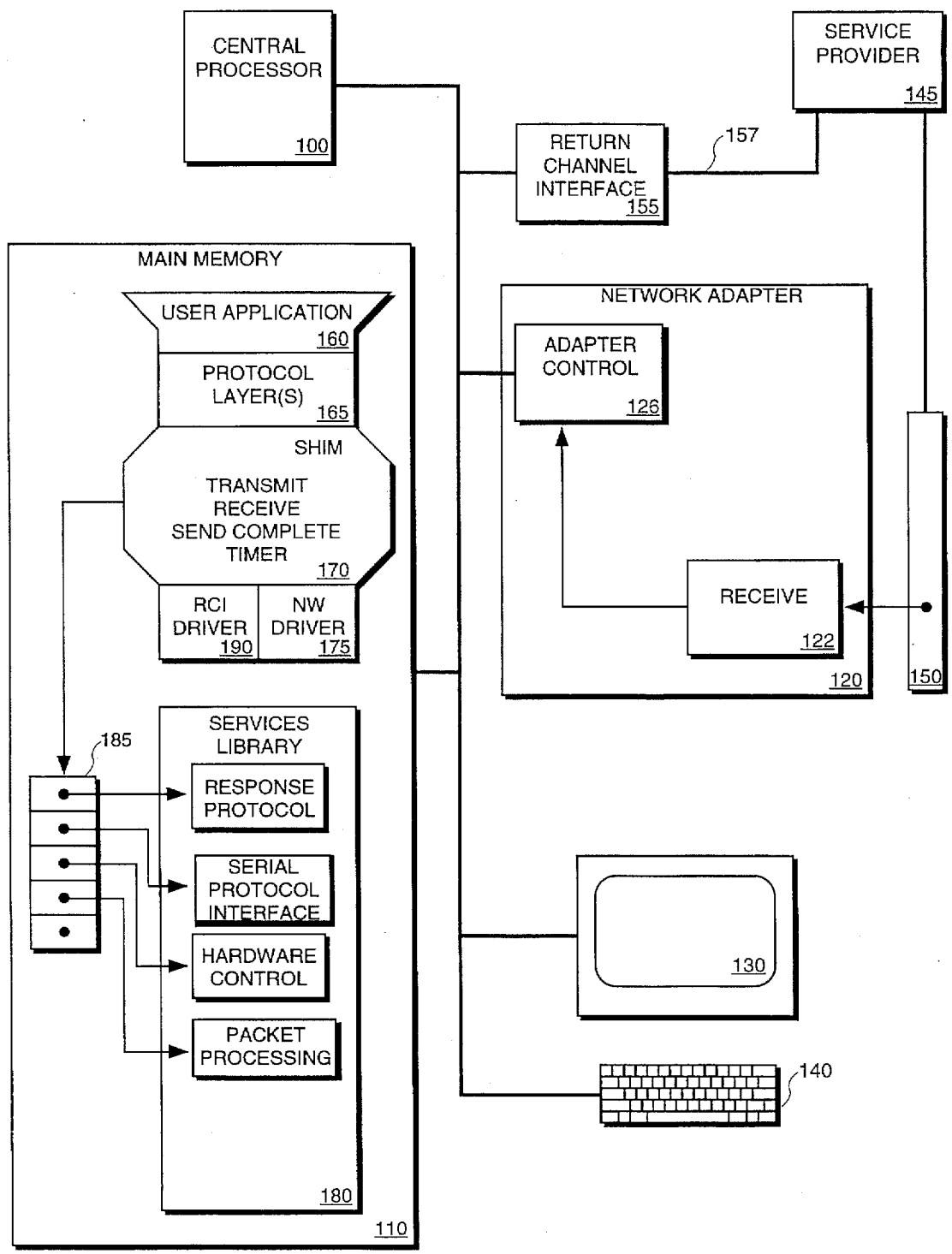
FIG. 1 is a block diagram of a computer of the present invention.

FIG. 1 shows a computer implementing the present invention. This computer uses memory resident routines, collectively referred to as a shim or a shim layer, to respond to network management packets from a forward channel 150 and to transmit packets via a return channel 157. These routines advantageously allow packet control transparent to an application 160. Additionally, the shim routines process incoming network packets and supply the service provider with status information. The present invention reduces the need for new computer components by utilizing existing processing, memory, and in some cases communication resources to implement these functions.

A computer system of the present invention may be a computer chiefly adapted to providing a low cost network interface. Alternately, the invention is also effective in virtually any personal computer including a complex computer system using separate memory caching, a processor bus (also known as a main memory bus), and a separate peripheral bus. Further, practicing the present invention may be advantageous in a portable computer system due to the power and spatial savings resulting from the elimination of duplicative components.

The computer comprises a central processor 100 coupled to a bus 105. The central processor may be a single central processing unit such as a Pentium® Processor or a Pentium® Pro Processor available from Intel Corporation of Santa Clara, Calif. Alternately, the central processor could be a processor distributed into several different integrated circuit chips or modules, or a processor card comprising one or more processing units. Any such central processing means provide the economies and advantages of the present invention.

The bus comprises address lines, data lines, and control lines including at least one interrupt line. The bus couples a plurality of these data lines and address lines to a display device 130 and a user input device 140. The display device is typically a monitor, and the user input device is typically a keyboard or a mouse. User input could also be taken from writing or voice recognition equipment. Either or both of the display device and the user input device may be coupled to the bus directly or through a secondary bus and bridge logic.

A network adapter 120 couples the forward channel 150 in communication with a main memory 110. The network adapter, like the display device and the user input device, may be directly coupled to the bus or may be coupled to the bus through bridge logic and a secondary bus. In either case, the network adapter is coupled in communication with the main memory.

The network adapter communicates with the network using an interface device 122. For a broadband network, the interface device includes demodulation receiver) circuitry and may also include transmission circuitry. The receiver circuitry receives modulated network signals and provides digital data to an adapter controller Various demodulation devices are presently available for broadband network communication by means of cable, fiber optics, or broadcast.

The adapter controller transmits network information to the main memory and interrupts the central processor. One embodiment of the network adapter utilizes a local area network (LAN) coprocessor such as one available from Intel Corporation. In this embodiment, the LAN coprocessor transfers network packets to the main memory and interrupts the central processor. The central processor checks a main memory resident "mailbox" in response to the interrupt and then continues to process the packet. Many possible variations of the network adapter can be used when practicing the present invention. Essentially, the network adapter only needs to provide network data in a form which can then be manipulated by other computer system components.

A return channel interface 155 is coupled to the bus and communicates with a service provider 145 through the return channel 157. In one embodiment, the return channel is a telephone system and the return interface comprises a modem coupled to a serial COM port of the computer.

The service provider is pictured as a single service provider which sends transmissions via the forward channel and receives return transmissions via the return channel. The service provider is then typically connected to another network or group of networks. The transmitting and receiving functions may be separated into distinct entities or separate service providers which are coupled to the other network or group of networks.

The main memory is a random access memory typically comprising dynamic random access memory chips (DRAMs). Alternately, static memories or any other storage means may be used to provide data and instruction storage available to the central processor. For example, data and instructions are often stored in non-volatile memory cells or on a hard disk.

The main memory contents comprise a network driver 175, a return channel interface (RCI) driver 190, a shim layer 170, a protocol stack having at least one protocol layer 165, and an application 160. The network driver is a commonly used type of routine which understands the hardware requirements of the network adapter. When executed by the central processor, the network driver initiates communication with the network by providing the appropriate control signals and data to the network adapter. Similarly, the return channel interface driver communicates with the return channel interface hardware.

The shim layer includes routines which communicate with the network driver. These routines implement a transmit function, a receive function, a send complete function, and a timer function. In one embodiment, these routines are interrupt service routines (ISRs), and the receive and the send complete ISRs have a common entry point.

One skilled in the art will recognize that various portions of computer code may overlap or be shared between routines. Further, even entry or exit points may overlap. Essentially, such routines can be rearranged in many ways. As described herein, a particular routine such as a "transmit interrupt service routine" need not exist in contiguous memory. Executing such a routine is accomplished by executing an instruction sequence implementing the identified function(s).

The shim layer also includes a pointer to a shim function table 185, which in turn has a plurality of pointers to control and data processing routines in a services library 180. The services library can also include driver functions which provide hardware control for the network adapter as well as service functions which process network packets.

Custom protocol routines in the services library provide the shim layer with a means to determine whether incoming packets are data packets or custom protocol packets. Further, the custom protocol routines provide the appropriate steps to reply to or otherwise act based on the custom protocol packets. For example, a custom protocol routine can identify a server poll packet received from a broadband cable network. The routine can then create an appropriate reply packet.

Figure 2:
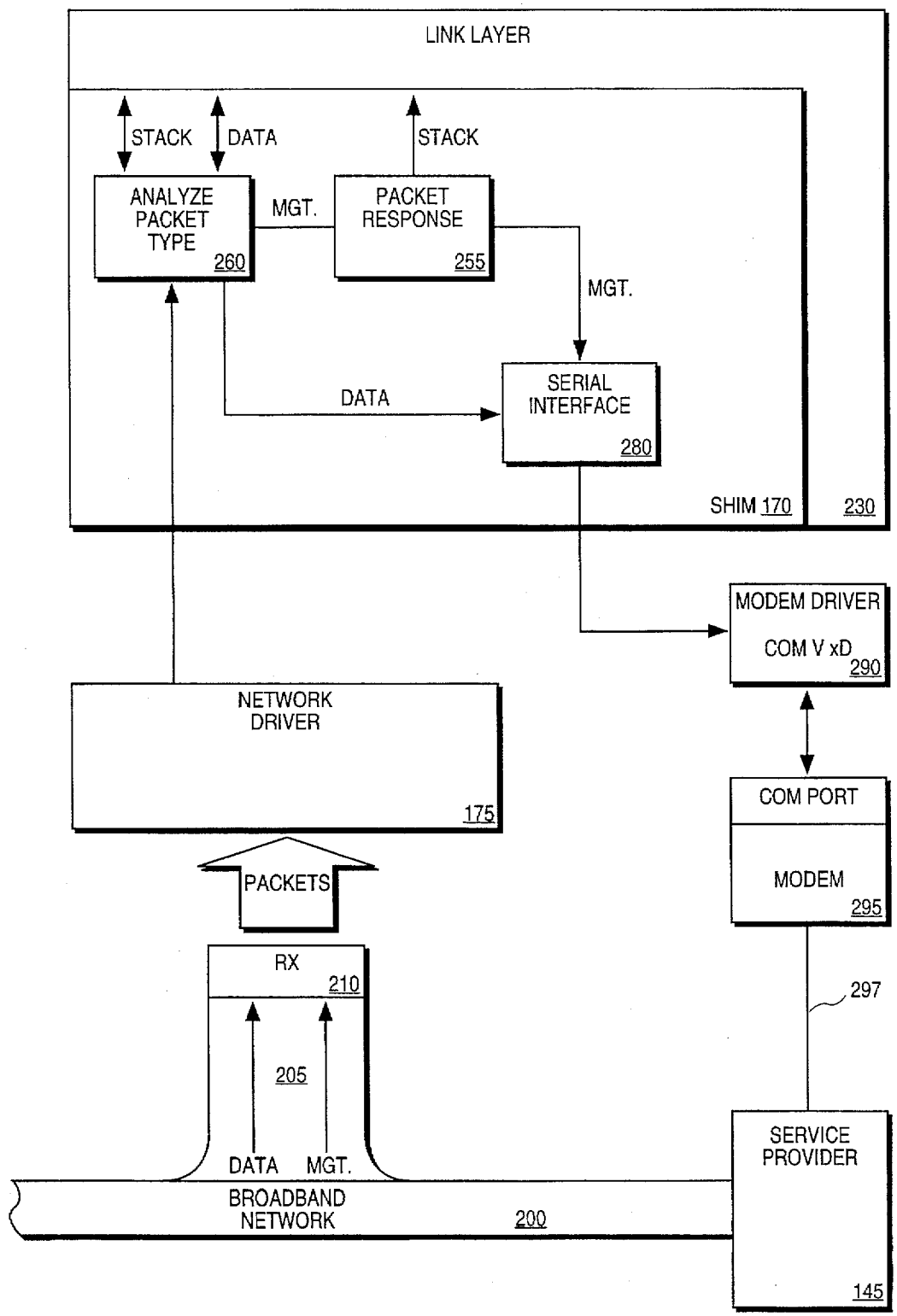
FIG. 2 is block diagram illustrating packet flow in a computer of the present invention.

An example of the packet flow upon which these routines operate is illustrated in FIG. 2. A broadband network 200 carries a modulated signal representing data and management packets. A coupling means 205 couples receiver circuit 210 to the network. The coupling means may simply be a coaxial cable or fiber optic cable. Alternately, separate amplifiers, repeaters, or transmitters (e.g. for portable devices) may be necessary for coupling to the broadband network. Preferably, the coupling means attaches to a connector on an outer housing of the computer; however, in one embodiment, the receive circuitry is at least partially located outside of the computer housing.

The receiver circuit tunes in a broadband channel and converts the modulated signal to digital information. The receiver circuit may include a LAN coprocessor and other circuitry capable of bi-directional communication; however, the receiver circuit only needs to receive data in this embodiment. The receiver circuit passes the digital information to the network driver as an assembled packet.

The network driver 175, a routine resident in memory, provides hardware specific control necessary to receive the incoming packet and notify the central processor of such receipt. Since the shim layer 170 provides the packet control required for the disparate communication channels, parts of the receiver circuit and the network driver do not require customization. For example, an existing LAN coprocessor and its respective driver routines may be used. This provides a great advantage in product development by reducing the time to market and the amount of testing required. On the other hand, newly developed components and drivers may also be used to practice the present invention. For example, total system cost may be further improved by reducing the processing required on the network adapter card and thereby allowing simplification of the adapter control.

The network driver communicates with the shim layer 170 which in turn communicates with a link layer 230 portion of the protocol stack. Like the network driver, the link layer can be a reliable pre-existing interface. To both the network driver and the link layer, the original interface appears to be in tact; however, the interposed shim layer gains control over packets flowing between the network driver and the link layer.

The return channel interface comprises a modem 295 coupled by a phone connection 297 to the service provider. A modem driver 290, such as a COM port virtual device driver, provides a serial interface through a COM port. The use of a virtual device driver and a COM port to provide telephonic communication is well known to those skilled in the art.

The routines of the shim layer provide several mechanisms to support the broadband network protocol as well as mechanisms for packet encoding and control. An analysis mechanism 260 analyzes a portion of a packet to determine if it is a network management packet or a data packet. Data packets pass from the network driver to the link layer routines. Data packets which pass from the link layer are passed to a serial interface mechanism 280.

The serial interface mechanism provides queuing control and also encodes packets into a serial format for transmission by the modem driver.

Stack packets, which may come from the network driver or the link layer, are passed to a response mechanism 255. The link layer sends packets such as address response protocol (ARP) packets which inquire about network resource addresses. The shim layer responds to those ARP packets with an address corresponding to the service provider since all network access requests go through the network service provider. This reduces the number of packets in the limited upstream bandwidth.

Management packets from the network service provider are received via the network driver. Such packets request status information and further facilitate network communication by providing information such as the address of the network service provider.

The described mechanisms could be implemented as separate hardware components or using a combination of software and hardware. In an implementation wherein the mechanisms are software routines, the processor sequentially embodies each mechanism.

In the embodiment using interrupt service routines, a special binding sequence is used. As part of binding (loading and exchanging of pointers done by various operating system routines), the network driver would normally exchange pointers with the link layer routines. Instead, the shim is loaded immediately after the link layer and before the device driver. Pointers are exchanged between the link layer and the shim and between the shim and the device drivers. As far as packet exchange is concerned, the shim layer is effectively interposed between the link layer and the device drivers.

Figure 3:
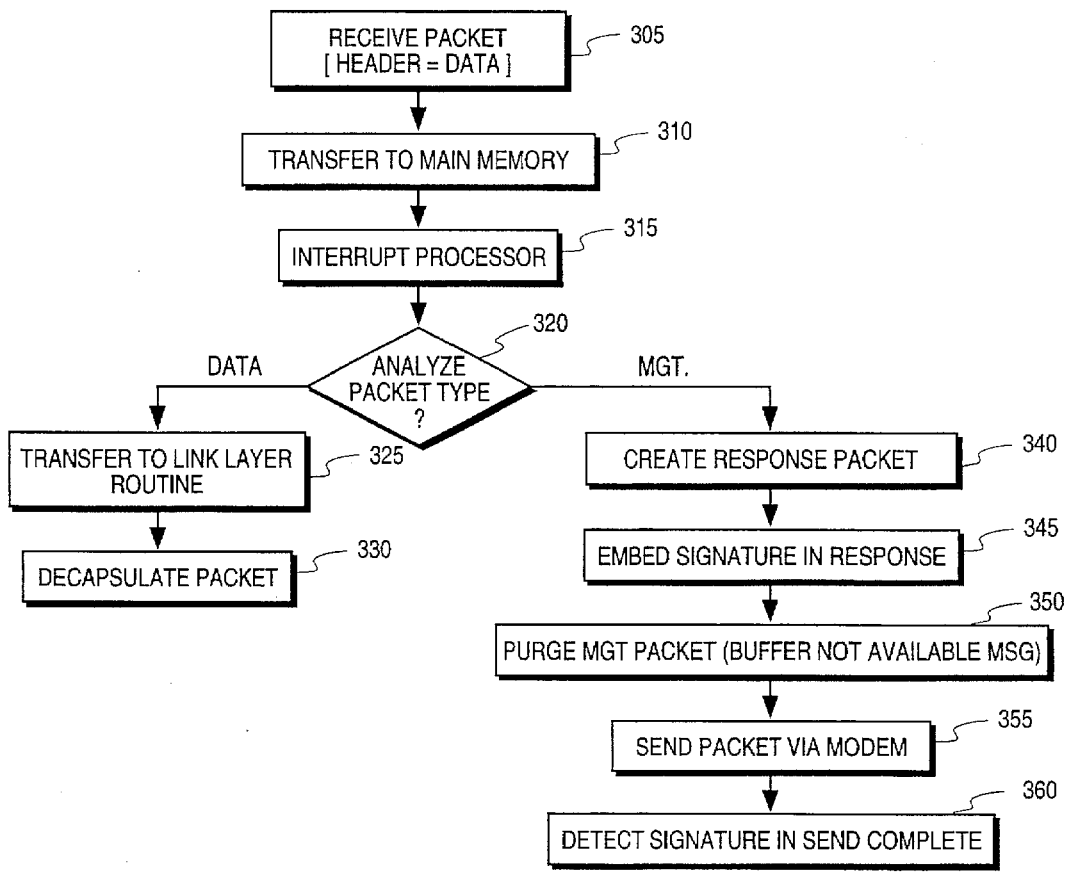
FIG. 3 is a flow diagram illustrating steps for receiving and processing packets according to the present invention.

One embodiment uses Novell's Open Data Link interface (ODI), described in The *Open Data Link Interface Developer's Guide for NetWare v3.1x Server Driver Protocol Stacks*, available from Novell Corporation of Orem, Utah. In this embodiment, the shim is linked through the 2F interrupt chain to Novell's link support layer and to a media specific module of ODI based device drivers The computer hardware and shim mechanism cooperate in receiving and processing a packet as shown in FIG. 3. A packet comprising a header and data is received in a receive packet step 305. The packet is received by the network adapter and transferred to main memory in a step 310. The network adapter then interrupts the processor in an interrupt processor step 315.

The central processor then enters the receive interrupt service routine and executes an analyze packet step 320. The packet type is determined by the contents of a field in the packet. For example, the data field of a transmission control protocol/internet protocol (TCP/IP) packet can be used to determine the packet type.

If, in the analysis step 320, the processor determines that the incoming packet is a network management packet, the receive interrupt service routine continues with a create response step 340. A buffer is allocated for a response packet which is encapsulated with status information if requested by the network management packet. One convenient method for buffer allocation is to maintain a circular queue. In an embodiment using Novell's ODI, an event control block (ECB) tracks a packet, thus a circular queue of ECBs is maintained.

An embed signature in response step 345 can be accomplished using any bit pattern which can later be recognized in an acknowledgment from the network driver. When using an ECB, an address of a shim error handling routine can be placed in an event service routine (ESR) field of the ECB. The ESR field points to a routine which the network driver calls to report events such as errors. Since no packet passing through the shim other than a shim generated packet should point to a shim error handling routine, the ESR serves as a signature to positively identify shim generated packets.

After the response packet is created, a purge management packet step 350 is executed. A buffer not available message is sent to the network driver, indicating that the driver can drop the packet. Next, a send packet via modem step 355 is completed by the computer.

After transmitting the packet, the modem interface generates an interrupt. With this interrupt, the device driver signals to the shim layer with a send complete message. In a detection step 360, the processor detects a signature (e.g. the shim address in the ESR field of the ECB) in the send complete message indicating that the packet is a shim generated packet.

The send complete message returned in response to the shim generated packet is purged to prevent its passing to the link layer routines. This completes the method used by one embodiment of the present invention to receive and process incoming packets.

Figure 4:
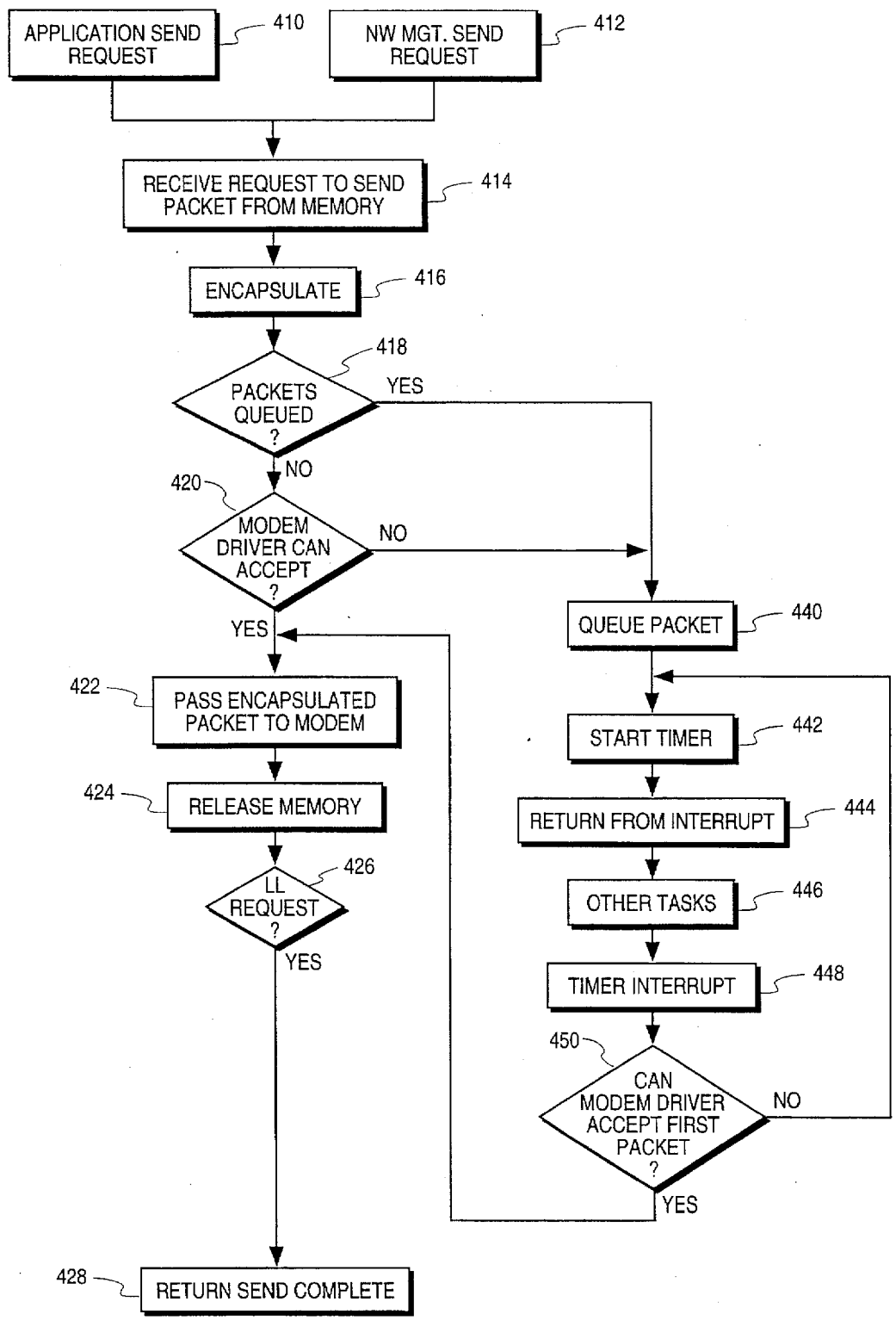
FIG. 4 is a flow diagram illustrating steps for generating, processing, and transmitting packets according to the present invention.

FIG. 4 illustrates details of the steps used in sending a packet to the service provider via the modem. An outgoing packet may originate in an application request step 410 or a network management request step 412. In either case, a transmit interrupt service routine is entered in a receive request step 414.

The process of sending the packet begins with an encapsulating step 416 wherein the packet is encapsulated and/or encoded for serial transmission. The encoding routine typically stores the encoded packet in a second memory location. A step 418 tests whether any packets are presently queued waiting for transmission. If there are packets queued, the outgoing packet is added to the queue in a step 440.

If there are no packets queued, the shim executes another test step 420 to test whether the modem driver can accept the outgoing packet. If the modem can accept the packet, the packet is passed to the modem in a step 422. If it cannot, the queuing step 440 is executed.

After the packet is queued, the shim routine executes a step 442 starting a timer. In one embodiment, the shim routines set the timer for one second. The processor returns from the interrupt in a step 444 and continues with other tasks as illustrated by a step 446. The timer expires and interrupts the processor as shown in a step 448. A step 450 determines whether the modem can accept the first packet in the queue. If the modem can accept the packet, the packet is passed to the modem in the step 422. Otherwise, the timer is restarted in the step 442.

Once the packet successfully passes to the modem, a release memory step 424 frees the memory that the outgoing packet occupied. The packet origin is determined in a step 426 by searching for a signature embedded by the shim layer. If the packet was a management packet from the shim layer, the shim routines do not need to return a message to the link layer routines; however, if the packet was a data packet which a link layer routine passed through the shim, a send complete message is returned to the link layer routine in a step 428.

Thus, the present invention provides a method and apparatus for providing controlling two way communication via disparate physical media. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A computer system comprising:
   a central processor coupled to a bus;
   a forward channel interface coupled to the bus, coupled to interrupt the central processor, and coupled to receive a packet from a forward channel which uses a first transmission media;
   a return channel interface coupled to the bus, the return channel interface being adapted to transmit packets using a second transmission media different than the first transmission media:
   a main memory coupled to the bus, the main memory containing a user application and an interrupt service routine, the interrupt service routine comprising a first set of code for passing the packet to a routine for decapsulating the packet, the main memory also containing a second set of code for passing a second packet to the return channel interface, and a third set of code for determining if the packet is a network management packet and calling the second set code to pass a response packet to the return channel interface if the packet is a network management packet.

2. The computer system of claim 1 wherein the return channel interface comprises a modem.

3. The computer system of claim 2 wherein the modem is coupled to the bus using a COM port interface.

4. The computer system of claim 3 wherein the memory further contains a routine for converting the packet to serial data and the second set of code comprises a call to the routine for converting.

5. The computer system of claim 4 wherein the return channel interface is coupled to pass the serial data to a service provider through a telephone connection.

6. The computer system of claim 5 wherein the first transmission media is a broadband network.

7. The computer system of claim 6 wherein the broadband network is a cable network.

8. The computer system of claim 1 wherein the main memory further contains a queuing routine called by said second set of code, the queuing routine passing the response packet to the return channel interface if the return channel interface can accept the response packet, otherwise, the queuing routine setting a timer to attempt to queue the packet at a later time.

9. The computer system of claim 1 wherein the user application generates the second packet.

10. The computer system of claim 1 wherein the first transmission media is a broadcast transmission media.

11. A computer system comprising:
    bus means for transferring computer system signals:
    return channel interface means coupled to the bus means for returning packets using a return channel transmission media;
    main memory means coupled to the bus means for storing a user application, a first routine for determining if an incoming packet is a network management packet, a second routine for passing a response packet to the return channel means if the incoming packet is a network management packet, an interrupt service routine comprising a first set of code for passing the packet to a routine for decapsulating the packet, and a second set of code for passing a second packet to the return channel interface;

central processing means coupled to the bus means, the central processing means for executing the first and the second sets of code;

forward channel interface means coupled to the bus means, the forward channel interface means for receiving the incoming packet from a forward channel transmission media which is different than the return channel transmission media.

12. The computer system of claim 11 wherein the forward channel interface means further comprises means for interrupting the central processing means after receiving the incoming packet, and wherein the central processing means executes the first and the second sets of code as a part of an interrupt service routine.

13. The computer system of claim 11 wherein the forward channel means comprises a network adapter coupled to the bus means and coupled to a broadband network and the return channel means comprises a modem.

14. A method of processing a packet received from a service provider by a computer comprising a central processor, a main memory containing a user application, a forward channel interface, and a return channel interface, the method comprising the steps of:

(a) the computer interrupting the central processor from executing the user application upon transferring the packet which is received from a first transmission media by the forward channel interface to the main memory;

(b) the central processor analyzing the packet to determine if the packet is a data packet or a network management packet;

(c) if the packet is a network management packet, then the central processor responding to the packet by executing routines:
  (i) creating a response packet;
  (ii) passing the response packet to the return channel interface for transmission using a second transmission media.

15. The method of claim 14 wherein the return channel interface comprises a modem which communicates with a device driver executed by the central processor, wherein the step (c)(i) of creating further comprises the step of embedding a signature in the response packet, and the step (c) of responding to the packet further comprises the step of:

(iii) detecting the signature from a send complete message sent by the device driver in response to the response packet.

16. The method of claim 14 further comprising the steps of:

(d) sending a data packet created by a user application by passing the data packet to the return channel interface.

17. The method of claim 14 wherein the step (c)(ii) of passing further comprises the steps of:

(A) testing if the return channel interface is available to accept the response packet;

(B) if the return channel interface is unavailable to accept the response packet, then
  (1) queuing the response packet;
  (2) starting a timer;
  (3) testing if the return channel interface is available to accept the response packet.

18. A method of processing a packet received from a service provider via a first transmission media by a computer comprising a central processor, a main memory containing a user application, a forward channel interface, and a return channel interface, the method comprising the steps of:

(a) the computer transferring the packet from the forward channel interface to the main memory;

(b) the central processor entering a receive interrupt service routine from the user application;

(c) the central processor analyzing a predefined portion of said packet to determine if the packet is a data packet or a network management packet;

(d) if the packet is a network management packet then
  (i) creating a response packet;
  (ii) passing the response packet to the return channel interface for transmission to the service provider via a second transmission media.

19. The method of claim 18 wherein the step (d)(i) of creating further comprises embedding a signature in the response packet, and the method further comprises the step of:

(d)(iii) the central processor executing a send complete interrupt service routine which detects the signature from a send complete message.

20. The method of claim 18 wherein the packet comprises a header and packet data and the portion analyzed by the interrupt service routine is the packet data.

21. The method of claim 18 wherein the step (d)(ii) of passing further comprises:

(A) testing if the return channel interface is available to accept the response packet;

(B) if the return channel interface is unavailable to accept the response packet, then
  (1) queuing the response packet;
  (2) starting a timer;
  (3) attempting to queue the packet by executing a timer interrupt service routine upon expiration of the timer.

* * * * *